(12) United States Patent
Volatier (10) Patent No.: US 11,478,107 B2
(45) Date of Patent: *Oct. 25, 2022

(54) METHOD FOR COOKING FOODS, AND APPARATUS IMPLEMENTING THE METHOD

(71) Applicant: SEB S.A., Ecully (FR)

(72) Inventor: Sebastien Volatier, Dijon (FR)

(73) Assignee: SEB S.A.

( * ) Notice: Subject to any disclaimer, the term of this patent is extended or adjusted under 35 U.S.C. 154(b) by 151 days.

This patent is subject to a terminal disclaimer.

(21) Appl. No.: 16/580,442

(22) Filed: Sep. 24, 2019

(65) Prior Publication Data

US 2020/0015624 A1 Jan. 16, 2020

Related U.S. Application Data

(63) Continuation of application No. 14/372,324, filed as application No. PCT/FR2013/050045 on Jan. 9, 2013, now Pat. No. 11,197,579.

(30) Foreign Application Priority Data

Jan. 16, 2012 (FR) ...................................... 1250414

(51) Int. Cl.
*A47J 37/06* (2006.01)
*A23L 5/10* (2016.01)
*A47J 36/32* (2006.01)

(52) U.S. Cl.
CPC ............ *A47J 37/0611* (2013.01); *A23L 5/15* (2016.08); *A47J 36/32* (2013.01); *A23V 2002/00* (2013.01)

(58) Field of Classification Search
CPC .......... A47J 37/0611; A47J 36/32; A23L 5/15
See application file for complete search history.

(56) References Cited

U.S. PATENT DOCUMENTS

| | | | |
|---|---|---|---|
| 8,931,400 B1 * | 1/2015 | Allen | A47J 36/321 99/344 |
| 2005/0193897 A1 | 9/2005 | Nevarez et al. | |
| 2006/0254430 A1 | 11/2006 | Nevarez et al. | |
| 2007/0288192 A1 | 12/2007 | Imgram et al. | |
| 2008/0083730 A1 | 4/2008 | Dolgov et al. | |
| 2009/0324785 A1 | 12/2009 | Ceravalls Pujol et al. | |

FOREIGN PATENT DOCUMENTS

| | | |
|---|---|---|
| CN | 1811277 A | 8/2006 |
| DE | 4302190 A1 | 7/1994 |
| GB | 2179763 A | 3/1987 |
| WO | 95/28116 A1 | 10/1995 |
| WO | 2007127072 A2 | 11/2007 |
| WO | 2007/149063 A2 | 12/2007 |

* cited by examiner

*Primary Examiner* — Steven N Leff
(74) *Attorney, Agent, or Firm* — Lerner, David, Littenberg, Krumholz & Mentlik, LLP (57) ABSTRACT

Provided is a cooking apparatus, preferably including a plurality of heating plates for contact cooking. The cooking time is determined by selecting a desired degree of cooking of the food. After estimating the surface area occupied by the food on one of the heating plates, said cooking time is calculated on the basis of the desired degree of cooking, the thickness of the food, and the surface area occupied by the food.

15 Claims, 6 Drawing Sheets

METHOD FOR COOKING FOODS, AND APPARATUS IMPLEMENTING THE METHOD

CROSS-REFERENCE TO RELATED APPLICATIONS

This application is a continuation of U.S. patent application Ser. No. 14/372,324, filed Jul. 15, 2014, which is the United States national phase of International Application No. PCT/FR2013/050045 filed Jan. 9, 2013, and claims priority to French Patent Application No. 1250414 filed Jan. 16, 2012, the disclosures of which are hereby incorporated in their entirety by reference.

FIELD OF THE INVENTION

The present invention relates to an apparatus for cooking food items by contact with at least one heating plate, and an associated method.

DESCRIPTION OF RELATED ART

Among these apparatuses, particularly well known are the dual-surface grills which comprise lower and upper heating plates between which one or more food items to be cooked are positioned. The food items are positioned horizontally on the lower heating plate. The food items can be meat, fish, vegetables or other.

DE 4302190 and WO 2007/149063 disclose a cooking method and device that are illustrative of the prior art.

However, these known solutions do not make it possible to obtain an optimized organoleptic result. They do not make it possible to provide an automatic cooking cycle that is truly favorable to the food and to the taste of the user.

Thus, the invention aims to provide a method for implementing an apparatus for cooking a food by contact with at least one heating plate, and the associated apparatus, making it possible to control the cooking of the food items automatically, according to a cooking process that is optimized to obtain:

a favorable organoleptic result,
an accurate cooking temperature at the core,
a texture and color to the taste of everyone.

SUMMARY OF THE INVENTION

In order to tend toward satisfying at least some of these objectives, two alternative approaches, but approaches that evolve from one and the same concept, are proposed.

According to the first approach, there are provided:
storage in a memory of the apparatus of different internal cooking temperatures (X) for the food,
to achieve an internal cooking of the food to a greater or lesser degree as then desired by a user, a selection by the user of one of said stored temperatures (X) and a placing of the food in contact with the heating plate or plates,
then, a calculation of the cooking time for the food as a function (at least) of the selected temperature (X).

To avoid overcooking should the user forget or not pay attention to the probable state of progress of the cooking cycle, it is preferred that, at the end of the calculated cooking time (T), there is favorably an indication by the apparatus that the desired cooking has been achieved.

Possibly, this indication could be replaced or complemented (and this will be valid for what follows) by an immediately automatic shutdown of the apparatus or a setting thereof to simply keep the cooked food hot. However, then, the thermal inertia could affect the quality of the cooking if the user does not quickly remove the food from the apparatus.

To favor the expected cooking in a way that is deemed safest, it is recommended to carry out:
a measurement of the thickness (Y) of the food then positioned against said heating plate and/or an estimation of the surface area (Z) occupied by this food on the heating plate,
and the calculation of the cooking time (T) for the duly positioned food, based:
in addition to the selected cooking temperature (X),
on the thickness (Y) of the food, and/or on the surface area (Z) occupied by the food.

According to the second approach, there are proposed:
again, storage in a memory of the apparatus of different internal cooking temperatures (X) for the food,
to achieve an internal cooking of the food to a greater or lesser degree as then desired by a user, once again a placing of the food in contact with the heating plate or plates, but then:
a calculation of a first cooking time (T) for the duly positioned food, as a function (at least) of the lowest temperature (X) out of those stored in memory,
at the end of said calculated first cooking time (T), an indication to the user, by the apparatus, that the corresponding cooking has been achieved, then:
if the user does not remove the food, the application by the apparatus of a calculated second cooking time (T) for the food, as a function of the second in ascending order of said temperatures stored in memory (X),
at the end of this calculated second cooking time (T), another indication to the user, by the apparatus, that the corresponding cooking has been achieved,
and so on.

Regardless of whether the first or second approach is applied, the storage in memory will be able to be a prestorage in the factory, before the first operational use of the apparatus.

Thus, the risks of errors and the intervention of the user will be limited.

According to the second approach, again to favor achieving the expected cooking that is deemed safest, it is similarly recommended to carry out, as already described:
a measurement of the thickness (Y) of the food then positioned against said heating plate and/or an estimation of the surface area (Z) occupied by this food on the heating plate,
the calculation of the cooking time (T) for the duly positioned food, based:
in addition to said internal cooking temperature (X) out of those stored in memory,
on the thickness (Y) of the food and/or on the surface area (Z) occupied by the food.

To favor the consideration of the thickness parameter and/or avoid, for example, having to turn over the food during cooking, which will be necessary with an apparatus like a cooking pan comprising only one heating plate, in this case the cap of this cooking pan that is placed on the heat source (electric, induction or similar plate, or even gas burner), provision is made, during said operation of the apparatus, for the food to be positioned between a plurality of said heating plates, on their contacts. A grill with electric heating elements is then particularly targeted.

Although, in any case, at least a part of the objective of automatic cooking can be achieved with this calculation of cooking time (T) of the food in contact with the heating plate or plates, possibly only as a function of said temperature(s) (X) stored in memory, it is however recommended that the calculation of the cooking time (T) for the food be a function of said surface area (Z) occupied by the food, which will then be obtained by heating plate temperature measurements.

To favorably limit the possible calculation drifts and reliably manage, in a minimum of time and as simply as possible, the estimation of said surface area (Z), it is recommended to measure, by at least one temperature sensor and following the placing of the food in contact with the heating plate or plates, the temperature of the or of one of the heating plate(s), and to compare the variation of the measured temperature evolving therefrom to at least one reference threshold.

Also in the interests of proven reliability, it is also recommended that the cooking time (T) for the food be obtained by a quadratic or linear correlation calculation method.

In order to also automate in an optimized manner the operation of the apparatus, by avoiding untimely starts not justified by the presence of a food and the will of the user, it is recommended that the implementation method concerned here comprise, before the food is placed in contact with the plate or plates, a step (A) of preheating of the apparatus followed by the step (B) of cooking of the food, the start of which is detected by a lowering against a predetermined threshold of the temperature of the or of one of the heating plate(s).

Once again to refine and make the implementation process reliable, with a view to optimized cooking quality, it is recommended:
  that the calculation of the cooking time (T) for the food be a function of said surface area (Z) occupied by the food and, to estimate this surface area,
  that a single temperature sensor be used, which, following the placing of the food in contact with the plate or plates, will measure the temperature of at least one of said plates, away from the area of contact of the food,
  and that the measured temperature variations which evolve therefrom or a time that is then calculated until a stabilization of the measured temperature, after said placement in contact, be compared to at least one threshold.

For said comparison, it is recommended to use the observed fact that there is a relationship between the surface area occupied by the food and:
  the time observed after introduction of the food until the stabilization, also observed, of the temperature drop following the hot plate(s)/food contact; namely the passage with (substantially) nil slope of the measured plate temperature,
  or this measured plate temperature drop (in terms of amplitude or in terms of minimum reached), following said placement of the food,
  or a rate of drop of this temperature.

Alternatively, a method has been devised whereby, the calculation of the cooking time (T) for the food then being a function of said surface area (Z) occupied by the food:
  to estimate this surface area, a number of temperature sensors are used which, following the placing of the food in contact with the plate or plates, will measure the temperature of at least one of said plates, in the area of contact of the food,
  and the measured temperature variations which evolve therefrom or a time that is then calculated until a stabilization of the measured temperature, after said placement in contact, are compared to at least one threshold.

A high organoleptic quality of the food will be able to be achieved if, as proposed elsewhere, during the step or steps of estimation of the surface area (Z) occupied by the food and/or of the thickness (Y) of the food, and/or of the calculation of the cooking time (T) for the food, there is marking of the food, with an electrical power delivered by the apparatus which is maximum.

In fact, a marking will thus be favored that:
  is rapid at the start of cooking for a better retention of the water in the meat, and therefore gives a better and more juicy character,
  is sufficiently sharp, while being able to prevent an harmful carbonization, to add taste and crustiness without generating carcinogenic compounds.

In order to refine the way in which the method is implemented for the purpose of quality in another way, it is also recommended that at least one of the following steps can be provided:
  selection of the category of the food to be cooked, and/or
  selection of the frozen state of the food, and/or
  selection of a desired grill marking of the food.

On this subject, it is also recommended that the cooking temperature ($\theta$) for the food after and the preheating temperature ($\theta'$) be a function of said selection made.

To further optimize the process of implementation of the method in another way, it is proposed that, after having positioned the food in contact with the plate or plates, it be possible to:
  measure the thickness (Y) of the food and,
  as a function of this measurement, trigger or not the cooking of the food by the calculation of the cooking time.

It is recommended, in the interests of accuracy and of simplicity and reliability of implementation, that the thickness (Y) of the food be determined by a measurement of the distance separating the heating plates between which the food is positioned.

Providing for consideration of the parameters X, Y and Z makes it possible to optimize the quality of the cooked product. The cooking time (T) will increase with the surface area of the heating plate occupied and the thickness (Y) of the food is high. The cooking time (T) will thus depend on the volume of the food put in place.

In addition to the abovementioned method with all or some of the features presented, one object of the invention relates to a cooking apparatus comprising:
  at least one heating plate for heating the food by contact and, to therefore achieve an internal cooking of the food to a greater or lesser degree as desired by a user:
  a memory for storing different internal cooking temperatures (X) for the food,
  means for measuring the thickness (Y) of the food then positioned in contact with the heating plate or plates and/or means for estimating the surface area (Z) occupied by this food on the or one of the heating plate(s),
  means for calculating at least one cooking time (T) for the duly positioned food, based:
    on at least one of the internal cooking temperatures (X) out of those stored in memory, and
    on the thickness (Y) of the food, and/or on the surface area (Z) occupied by the food;
  and means for indicating to the user, by the apparatus, that the corresponding cooking has been achieved.

In the interests of accuracy and simplicity and reliability of implementation, it is recommended that the means for estimating the surface area (Z) occupied by the food on the heating plate comprise at least one temperature sensor measuring the temperature of the or of at least one of the heating plate(s).

Assuming in particular a single-sensor option, with optimized control of the cooking, it is also recommended that the temperature sensor be situated in an area not likely to be in contact with the food.

Again with a view to optimizing the apparatus and therefore the process of implementing its operating mode, it is proposed that the means for calculating the cooking time (T) for the food comprise a microcontroller configured to determine the slope of the temperature curve obtained from the measurements of the temperature sensor(s).

BRIEF DESCRIPTION OF THE DRAWINGS

Other features and advantages of the invention will emerge clearly from the following description, in the case of a common use of the abovementioned three parameters (X, Y, Z), and in an indicative and in no way limiting manner, with reference to the attached drawings, in which.

DETAILED DESCRIPTION OF THE INVENTION

What is described below is intended to be implemented in a cooking apparatus. Such an apparatus here comprises two shells articulated relative to one another, i.e. a lower shell 9 and a upper shell 90; see FIGS. 7, 8. The lower shell 9 comprises a lower heating plate 61 and the upper shell comprises an upper heating plate 63. Each shell comprises a heating resistor 10 positioned between the heating plate and the bottom of the shell.

In the normal position of operation of the apparatus, the food or food items to be cooked are positioned horizontally on the lower heating plate which extends along a horizontal plane. The food can be meat, or other food.

Figure 1:
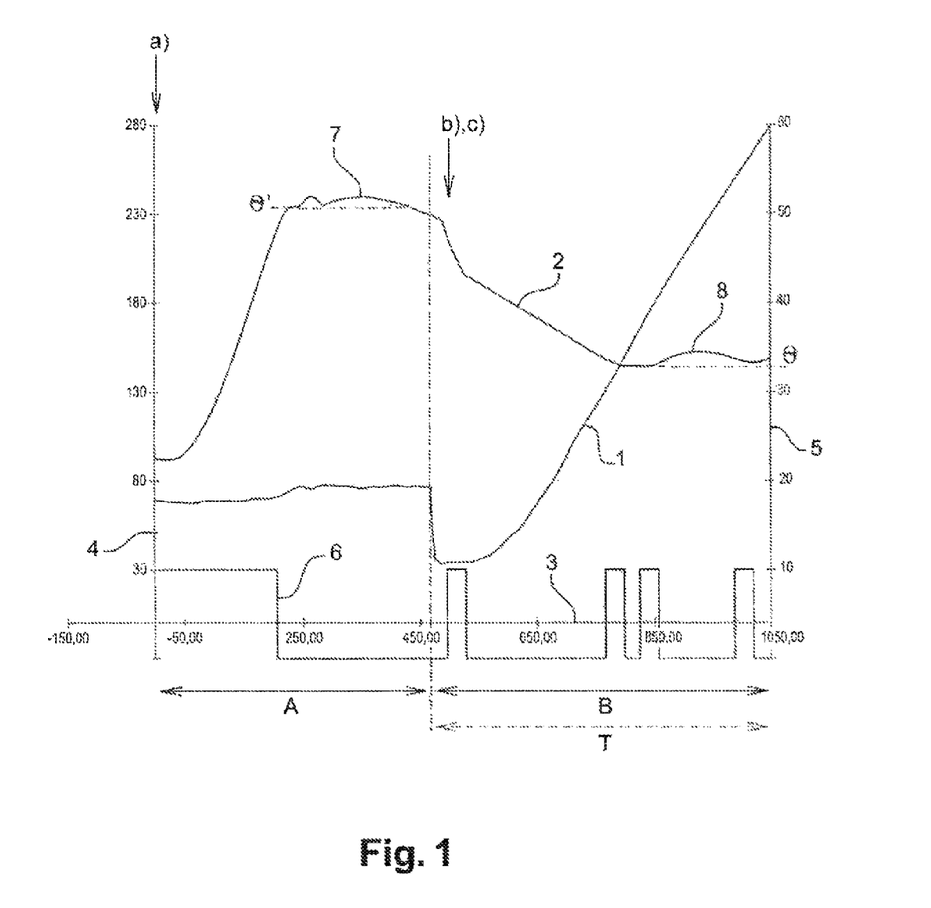
FIG. 1 represents an example of cooking process according to one embodiment of the invention.

As illustrated in FIG. 1, the cooking method comprises a preheating A) of the apparatus followed by a cooking B) of the food for a time (T).

FIG. 1 represents a process of cooking a non-frozen meat as an example. The curve 1 represents the trend of the temperature measured at the core of the food as a function of time. It was acquired in the factory and does not necessarily exist in the apparatus marketed. At least some of these points are, however, entered into memory 72 of the apparatus. The curve 2 represents the trend as a function of time of the temperature of one of the heating plates, which is measured during commercial operation of the apparatus. The x axis 3 represents the time in seconds, the y axis on the left 4 represents the measured temperature of the heating plate concerned, such as 63, and the y axis on the right 5 represents the temperature measured at the core of the food. The curve 6 represents the heating cycle as a function of time (consumed power). During the step A), the measured temperature of the plate rises rapidly to a level 7 corresponding to a preheating temperature. In the example 2, this temperature is approximately 230° C. Once this is reached, the food is placed on the lower heating plate. The high contact temperature makes it possible to make a marking on the food. A crust is then formed.

The setting of the food in the heating apparatus corresponds to the start of the step of cooking of the food B). The measured temperature of the heating plate (curve 2) drops to a temperature stabilization level 8, corresponding to approximately 150° C. in the example.

By way of confirmation (since a priori not available in the apparatus), the curve 1 shows that the temperature of the food rises in the meantime gradually to a temperature which is a function of the category of the food, or even of its frozen state.

Figure 9:
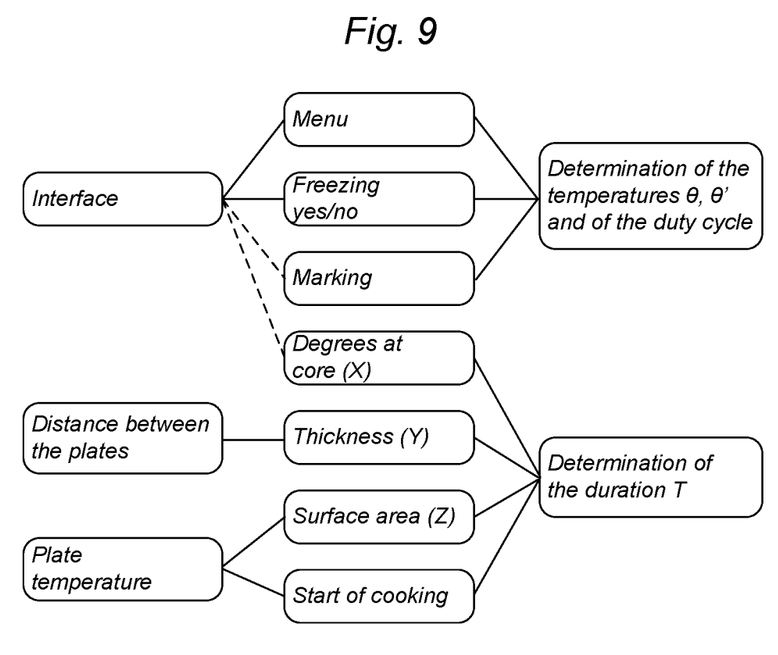
FIG. 9 shows a first block diagram of controlled cooking.

FIG. 9 shows a first block diagram of controlled cooking.

Figure 7:
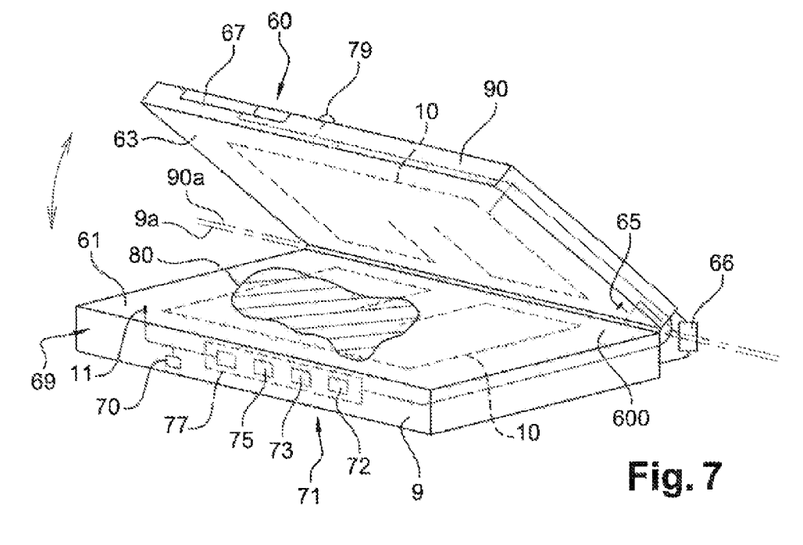
FIGS. 7, 8 show a cooking apparatus of grill type making it possible to implement the method that is the object of the invention.

Before this block diagram scheme is implemented, with, for example, the apparatus schematically represented in FIG. 7, it is understood that in the factory (therefore before marketing of the apparatus), in particular different internal cooking temperatures (X) for the food (preferably for several foods) have been stored in the memory 72 of the apparatus, allowing for example, at least one given food to be cooked to the core successively rare, medium-rare and well cooked.

Figure 3:
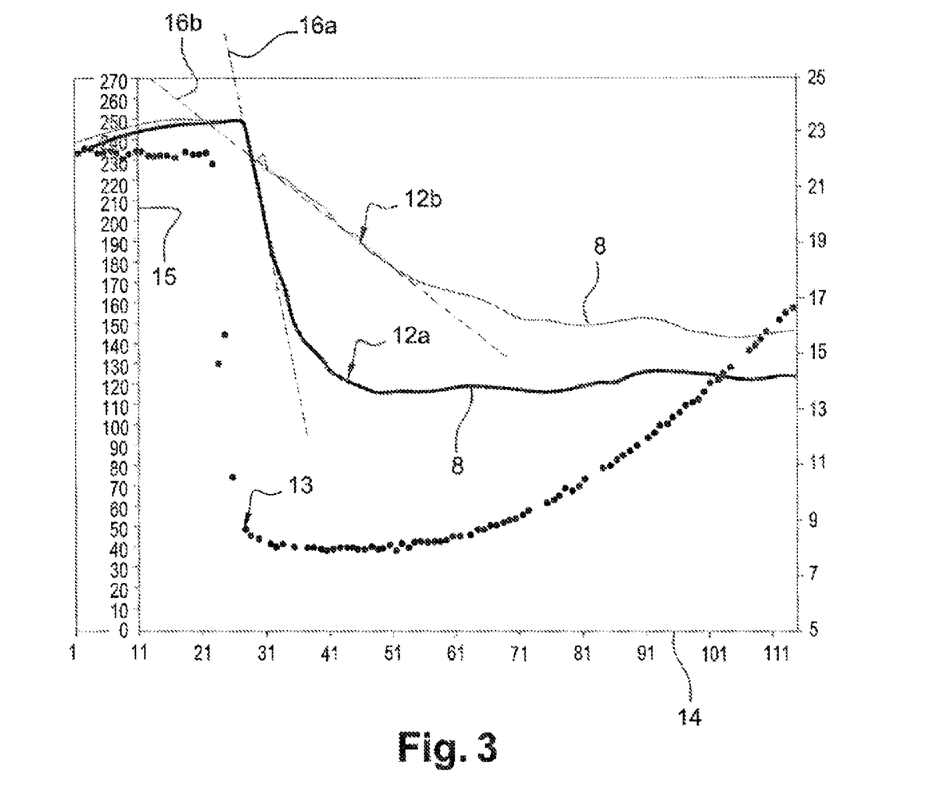
FIG. 3 represents the two temperature curves measured by two temperature sensors of one of the enclosures, such as the lower shell, and the temperature curve measured at the core of the food as a function of time.

This having been done and the apparatus sold, when its user goes to use it, the following steps will be implemented:

powering up of the apparatus 1, for example by pressing on an on/off button 70;

via the interface 67 of the apparatus, and in the menu that the latter then displays, selection on the apparatus, by the user, preferably first of a food category to be cooked (choice for example between meat and fish), then, here, of a degree (X) of internal cooking desired for the food, out of several available (if provided);

determination:
of the temperatures θ: maximum preheating temperature (before placement of the food) given the food category, if the latter can be selected, and θ': minimum or final cooking temperature for the food (after he or she has placed the food), again taking into account its category, if provided,
and of the duty cycle: evolutions of the electrical energy supplied to the elements 10 from the source provided (such as the mains); definition and application of the variations, which can be binary—maximum or zero, of this energy; see curve 6;

preheating of the cooking apparatus (step A), via the resistors 10, with application of a predetermined preheating time defined in factory tests, then entered into memory 72 and which makes it possible to achieve the stabilized temperature θ for the planned interval;

with the cooking apparatus open, placement of the food;

closure of the cooking apparatus; this will preferably be necessary to activate the start of the cooking of the food (step B), with, then, preferably automatically, a measurement of the thickness (Y) of the food introduced between the plates 61, 63;

the apparatus then automatically detects an abrupt lowering of the measured temperature of the heating plate concerned (contact with the food), after which the temperature is substantially stabilized; see zone 8, FIG. 1 or 3. Preferably, this start of cooking step B) will be detected:
- as a function of this lowering of measured temperature(s) (in terms of time, speed, slope, etc),
- and by comparison with one or more predetermined thresholds of the drop detected;

from this/these temperature variation(s) measured on the plate concerned of the grill, there may then be an estimation of the load (or surface area occupied by the food): abovementioned parameter (Z);

still preferably at the start of this cooking step, there is also estimation/calculation by the apparatus of the required cooking time (T). This time is therefore that, indicated for example in FIG. 1 (T), between the moment when the food is placed in contact with the heating plate or plates and that when it is removed therefrom, at the end of cooking. The origin moment can typically be that of the closure of the apparatus, if it is a grill, followed almost immediately by the detected measured plate temperature drop. The end moment is also that when the announcement that the cooking has been achieved is made by the apparatus. The expected internal cooking temperature/degree (X) is achieved;

via, for example, a microcontroller 73, 75, and indicator 79 accessible to the user, provision can then be made for the user, at the end of the calculated time, to be informed by the apparatus that the expected degree (X) of cooking has been achieved; the user is thus prompted to remove his or her food;

the apparatus can then, for example, automatically keep the food hot while waiting for the user to open the apparatus;

the apparatus can finally be powered down, for example via the switch 70.

Thus, the end of cooking is established at the end of the estimated/calculated time T, when, once the food has been placed in the preheated apparatus, the measured temperature, after having dropped because of this food, is stabilized (zone 8, FIG. 1 or 4), for example between two values for which the difference has been predefined and entered into memory 72.

In addition to the above, the interface 67 with the user may make it possible to select from the menu the frozen state of the food (frozen or not) and/or the amount of grill marking desired (strongly marked or other).

The interface 67 can be a touch screen.

In the above block diagram scheme, the cooking time (T) for the food in the abovementioned step B) is determined according to a process in which the steps set out below have been carried out:
- a step of measurement of the thickness (Y) of the food,
- a step of estimation by the apparatus of the surface area (Z) occupied by the food on one of the heating plates,
- a step of calculation in the apparatus of a cooking time (T) for the food, as a function:
  - of the degree (X) of internal cooking of the food,
  - of the thickness (Y) of the food,
  - of the surface area (Z) occupied by the food.

The degrees (X) that can be selected will be able to correspond to respectively rare, medium and well-done cooking cycles. Each case will, in memory 72, have a corresponding cooking temperature taken from the curve 1, in the factory. Thus, it will be possible to have three values of the parameter, respectively 55° C., 65° C. and 75° C.

To measure the thickness (Y) of the food, the apparatus can be provided with sensor means 65 detecting the mean distance between the lower and upper heating plates, 61, 63, and in particular their relative separation when the food is introduced between them. It is then possible to obtain a food thickness which is a function of the relative displacement distance of the plates between them, when the apparatus is closed.

In FIG. 7, it can be seen that these heating plates are rotationally mobile relative to one another. When the upper heating plate is in horizontal position after having been displaced toward the lower heating plate, a positioning mechanism 66 can linearly and vertically displace the upper heating plate (by moving one of these plates closer to or further away from the other) until there is contact with the interposed food.

As an example, the sensor means 65 can comprise at least one optoelectronic sensor or one inductive proximity sensor. It could alternatively be a forced sensor measuring, for example, the force on a spring blade via a strain gauge, or a magnetic incremental position sensor using the Hall effect (again, distance measurement).

Once the preheating is finished, the automatic triggering, by the apparatus, of the cooking step will preferably occur only if the sensor means 65 measure a value that is neither zero nor "infinity".

Figure 8:
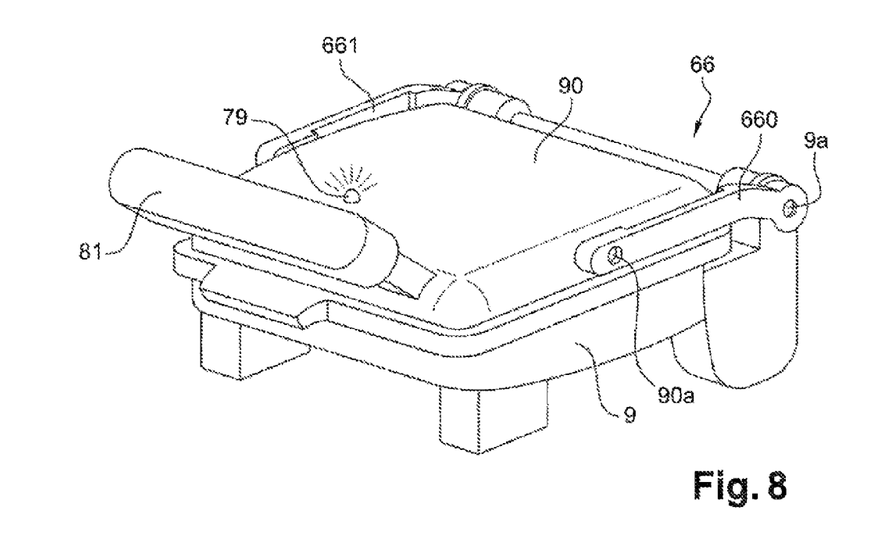

In FIG. 8, it can be seen that the positioning means or mechanism 66 comprise arms 660, 661 mounted articulated between the lower 9 and upper 90 shells. These arms, here two, 660, 661, are fixed, here laterally, close to one of the edges of each of the enclosures, such that two parallel axes of rotation 9a, 90a (horizontal) passing through the fixings of the arms 660, 661 are defined, for the relative movements between the heating plates. Opposite, a handle 81 fixed to one of the enclosures, here 90, assists in the maneuver.

During the abovementioned step of estimation of the surface area (Z), means for estimating this surface area determine whether the heating plate, provided with the load sensor(s), is fully loaded, partially loaded, or not loaded (cooking apparatus empty). This estimation can therefore be obtained from variations of temperature data measured on one (at least) of these plates.

The step will preferably comprise, advantageously for a predefined time (T) which begins from the detection of the start of the cooking step B):
- a sub-step of measurement of the temperature of the heating plate fitted (upper plate 63, FIG. 7),
- then a sub-step of determination of this surface area (Z) as a function:
  - a) of the calculated time to achieve a substantially more stabilized slope (abovementioned zone 8, FIGS. 1, 3) of trend of this measured temperature,
  - or b) of a drop in this temperature compared to a predetermined threshold (value(s) in amplitude on reaching a minimum temperature and/or in terms of slope(s), [B, see below],
- with, in the case a), the existence of a relationship between the surface area and the quantity of energy to be provided to compensate for the heat losses due to the placement of the food.

The calculation of this parameter will be able to be performed by a calculating means such as a microcontroller with which the apparatus is equipped.

Figure 2:
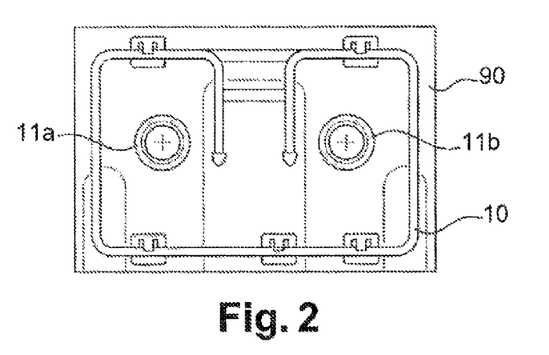
FIG. 2 represents a lower shell of a cooking apparatus provided with two temperature sensors, according to one embodiment of the invention.

With a multi-sensor solution, such as, for example, with the two temperature sensors 11a, 11b, shown in FIG. 2 (even if it will be preferred to place a first sensor centered on a side (such as 11a, FIG. 3), and a second off-center), comparisons, preferably of slope values, calculated for one and the other of these sensors, with a predetermined threshold, stored in memory 72, will be able to make it possible to define the values of the parameter (Z) to be used.

With the solution with two temperature sensors 11a, 11b shown in FIG. 2, and if the parameter retained is the slope, the following thresholds will be able to be considered:

if slope >−0.5° C./s for the two sensors=>surface area Z little/not loaded=>value Z1, if slope <−0.5° C./s for one of the sensors, with =>surface area Z averagely loaded=>value Z2, if slope <−0.5° C./s for the two sensors=>surface area Z fully loaded=>value Z3.

As temperature sensor(s), it will be possible to choose probes with negative temperature coefficient (NTC). They will be able to be housed behind the heating plate which will cover them internally.

Computation means then make it possible to calculate the cooking time (T) for the food as a function of the degree of the internal cooking temperature (X) desired, here selected, for the food, of the thickness (Y) of the food, and/or of the surface area (Z) that it occupies.

This cooking time (T) for the food can be determined by a quadratic correlation calculation method with the following second degree function:

$$T(X,Y,Z)=A1+A2*X+A3*Y+A4*Z+A5*X^2+A6*Y^2+A7*Z^2+A8*X*Y+A9*X*Z+A10*Y*Z. \quad (1)$$

The coefficients A1, A2, A3, A4, A5, A6, A7, A8, A9 and A10 are predefined for each menu, for predefined temperature conditions. They are stored in storage means (such as the memory 72). They are constants.

As a variant, the cooking time (T) for the food can be determined by a linear correlation calculation method with the following first degree function:

$$T(X,Y,Z)=B1+B2*X+B3*Y+B4*Z \quad (2)$$

The coefficients B1, B2, B3 and B4 are predefined for each menu, for predefined temperature conditions. They are stored in said storage means (memory 72 for example). They are constants.

The linear correlation method is preferred to the other because, although less accurate, it requires only four coefficients. Here, it is more efficient.

Regarding the estimation of the surface area occupied by the foods, the possibility of an estimation of the surface area (Z) via (at least) two temperature sensors (values Z1, Z2, etc), has been described above.

Another possibility consists in using only a single energy sensor (item 11, FIG. 7) which can be a temperature probe placed, as previously, in contact with one of the heating plates. Favorably, this sensor will be offset (toward) the periphery of the heating plate concerned, facing an area of the plate where food should (or can) not be placed. The sensor will be able to fulfill two functions, in conjunction with the microcontroller(s):

regulating the temperature of the plate, measuring the quantity of energy to be supplied to compensate for the losses linked to the presence of the food(s) on the plate. Assuming that the food items are steaks (see FIGS. 4-6), it will be possible to correlate this with the number of such steaks present, cooking on the plate, or the size of the surface area occupied.

Thus:

a slope beyond a first threshold retained and stored in memory 72 will be able to correspond to a heating plate fully occupied by the food, a slope below a second threshold will be able to correspond to an unoccupied heating plate, and a slope between the two thresholds will be able to correspond to a partially occupied heating plate.

Figure 4:
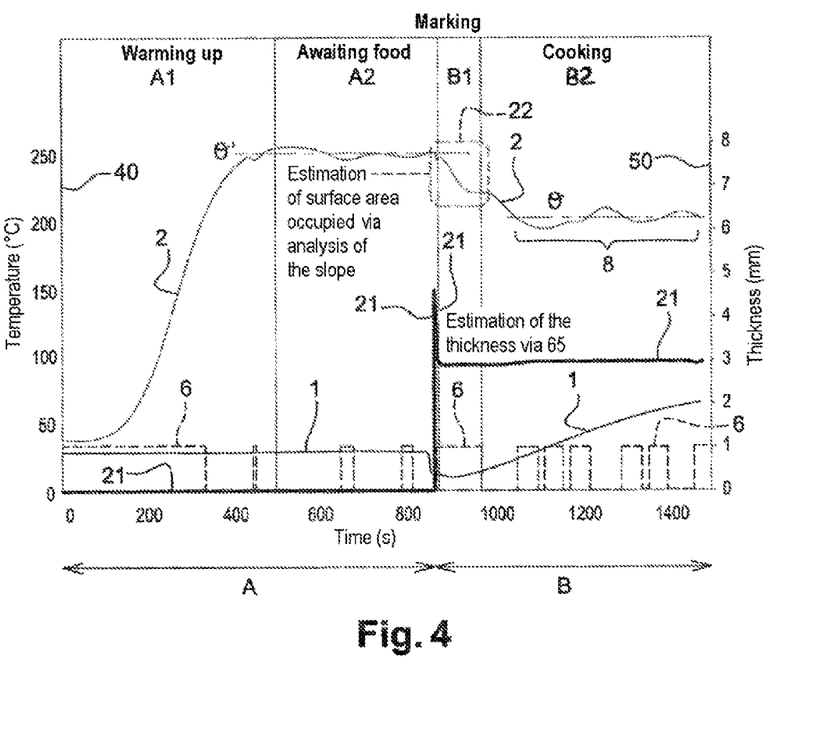
FIG. 4 shows an example of cooking kinetics ensuring a cooking with marking, independently of the number of food items on the plate, with measurement of temperatures by a single sensor, FIGS. 5, 6 respectively show the trend of the temperature of the temperature sensor provided, as a function of time and of the surface area occupied by the food, and the trend of the slope of the curve 2 as a function of time and of the surface area occupied.

To illustrate this, FIG. 4 shows an example of cooking kinetics established on the following bases: cooking of three steaks cut from a topside round, common thickness of 29 mm, identical surface areas of the plates 61, 63 substantially fully occupied (except just at the periphery where the temperature sensor 11 is located; FIG. 7), expected core temperature (at the end of cooking) of approximately 60° C., cooking time approximately 23 min (calculated).

This kinetic could be considered to be valid regardless of the surface area estimation method used; it could therefore replace the illustration of FIG. 1 where the curve 2 concerned a multi-sensor application.

In FIG. 4, the x axis represents the time in seconds, the y axis on the left 4 represents the temperature (° C.). The y axis on the right 50 represents the thickness (mm) of the food. The curve 21 represents the trend of the thickness of the food(s) present on the heating plate as a function of time. The trend of the curve 2 is comparable to that of FIG. 1 (see comments above). After the step A(=A1+A2) of preheating, the placing of the food in the heating apparatus corresponds to the start of the step B(=B1+B2) of cooking of this food.

The following occurs therein:

a cooking cycle in two phases:

a phase B1 of marking;

a phase B2 of cooking at lower temperature, to allow time for the calories to migrate to the core without risking charring the periphery;

a marking time approximately proportional to the exchange surface area (Z) and therefore to the quantity of food items.

Throughout the phase 22 identified by the square with the broken-line outline where there is marking of the food or food items, there is no reversal of the cycle of delivery of the electrical power (the electrical power/energy delivered to the elements remains maximum).

It is preferably the interval during which the analysis phase (B1, broken line square 22, FIG. 4) is performed: values Y and/or Z, calculated time T.

Figure 5:
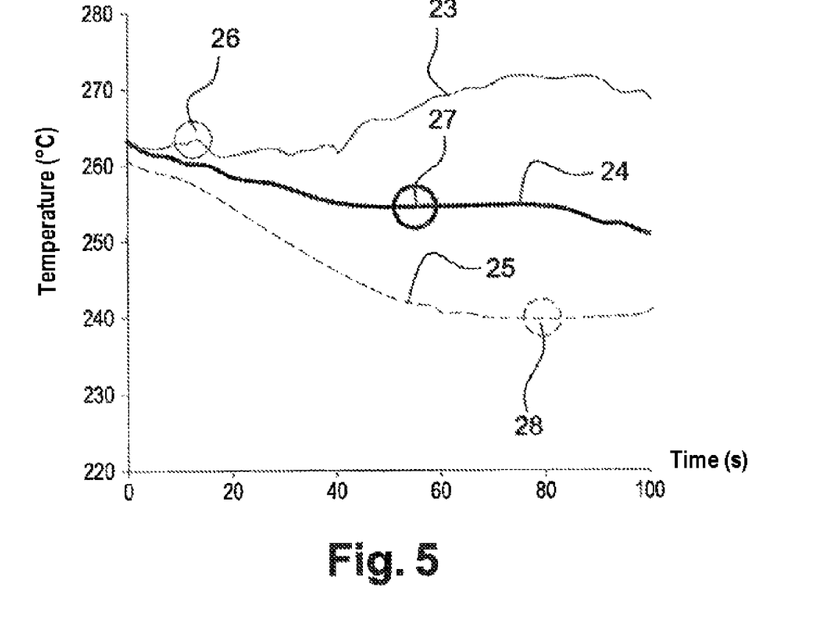
Figure 6:
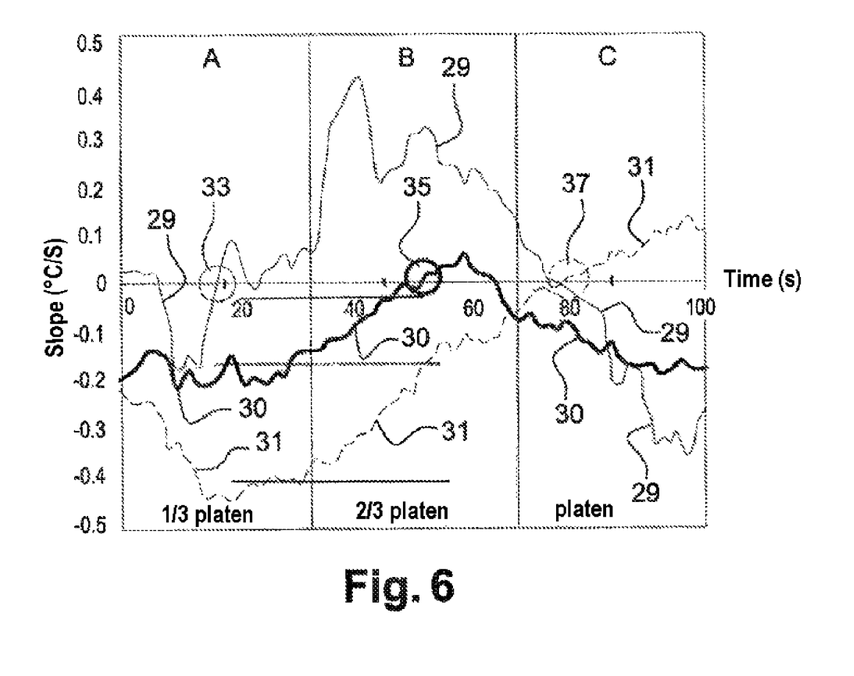

Regarding the estimation of the surface area (Z) occupied by the food items, FIGS. 5, 6 show respectively:

the trend of the temperature detected as a function of time and of said occupied surface area, the trend of the slope of the curve 2 as a function of time and of the occupied surface area.

In FIGS. 5, 6, the origin of the time (T=0) is the moment when the food item is placed in the heating apparatus, i.e. here (as indicated in FIGS. 1 and 4), the start of the step of cooking of the food item (B).

In FIG. 5, the curves 23, 24, 25 correspond respectively to the steak cases 1, 2, 3. The circles 26, 27, 28 show the respective slope cancelations.

In FIG. 6, the y axis corresponds to the slope (in ° C./s), the x axis is the time (in s).

The curves 29, 30, 31 correspond respectively to the steak cases 1, 2, 3. The circles 33, 35, 37 show the respective slope cancelations (passage through the time x axis).

The analysis of the slope concerned makes it possible to reveal that there are correlations between:

the exchange surface area and the minimum slope, or the temperature drop at a given instant, the exchange surface area and the instant when the slope is canceled (instant when the losses linked to the exchanges between the food items and the plate have been compensated).

The second relationship (FIG. 6) is deemed more reliable because it is less dependent on the accuracy of the calculations (see dispersion on curve with a steak) and on the position of the sensor on the plate.

It is then possible to consider two methods for estimating the occupied surface area:

establishing, via a series of experiments conducted in the factory, before the marketing of the apparatus, the affine function (y=ax+b) which links the occupied surface area to the instant when the slope reverses, identifying three areas:

area A, plate with low load (⅓ of the plate occupied),
area B, plate with average load (⅔ plate),
area C, plate fully loaded (3/3 plate), then testing the correspondence of the system to one or other of these three areas.

This method is potentially easier to synchronize with the communication to the user of the corresponding information (indicator 79).

In this case:

it is essential for the sensor 11 to be positioned on an area without food, such as the perimeter of the plate, the following are taken into account, as explained above:

the existence of a correlation between the reversal of the temperature trend slope detected by this sensor and the exchange surface area between the heating plate concerned and the food (the food items) positioned against said plate: passage through a zero trend slope; see above, the existence of a correlation between the minimum slope and said exchange surface area.

In the above, it will have been understood that two methods were therefore considered for estimating the occupied surface area:

a first able to use only a single temperature sensor 11 remotely cited at the periphery of the plate concerned, and therefore with the existence of a relationship between the surface area occupied by the interposed food and the quantity of energy to be provided to compensate the losses (time observed for slope of the curve 2 equal to 0), or a greater or lesser temperature drop (temperature threshold), or a faster or slower temperature drop (slope threshold), a second using a number of temperature sensors, such as 11a, 11b, distributed on or under the plate concerned, and then with the presence or not of food (food items) approximately of two, three, even four sensors.

It should also be noted that, if the temperature sensor(s) 11 or 11a, 11b is (are) positioned in such a way that it (they) detects (detect) the temperature of the cooking plate (here upper plate) which comes into contact with the food only when the two plates 61, 63 are displaced relative to one another to close the apparatus (moment when the cooking time=0), it will then be possible to have two information items to trigger the start of the cooking (phase B): the one from the temperature sensor or sensors and the one from the thickness sensor.

In FIG. 7, it will also be noted that the cooking apparatus 60 of meat grill type therefore comprises the lower 61 and upper 63 heating plates, as follows:

the means 65 for measuring the thickness (Y) of one or more food item(s) (here called "food" 80), such as the abovementioned steak(s) (these means 65 are linked functionally to the means 66 for the relative convergence/separation of the plates 61, 63);

the selection means 67 for selecting, from a number of presets, the degree/temperature (X) of internal cooking desired for the food;

means 69 for estimating the surface area (Z) occupied by the food on one of the heating plates; and means 71 for calculating the cooking time (T) for the food.

A cooking chamber 600 for the food (FIG. 7) is defined between the lower 61 and upper 63 heating plates.

The means 69 for estimating the surface area (Z) comprise the abovementioned temperature sensor 11 or sensors 11a, 11b.

In order to best achieve the estimation of the surface area (Z) occupied by the food 80, it is also recommended that the means 71 for calculating the cooking time (T) for the food comprise the microcontroller 73 configured to determine the slope of the temperature curve obtained from the abovementioned temperature measurements.

And, to the same end, it is also recommended that, with these temperature measurements, this microcontroller, or another 75:

regulate the temperature of the heating plate 61 or 63, and
change the quantity of energy to be supplied, via the element or elements 10, as a function of the size of the surface area occupied by said food items on the heating plate concerned, in order therefore to compensate the temperature drops linked to the placement of these food items between the plates.

The microcontrollers 73, 75 can be combined in a central microcontroller 77. The microcontroller(s) is/are linked to the abovementioned means 65, 66, 67, 69/11 (or 11a, 11b), 70, 71, 72, 79 and to the elements 10, to control them. Regarding the inclusion of the internal degree (X) of cooking to be achieved for the food, it has already been understood that it is possible to dispense with the abovementioned step of selection by the user of one of said temperatures stored in memory for this purpose.

Figure 10:
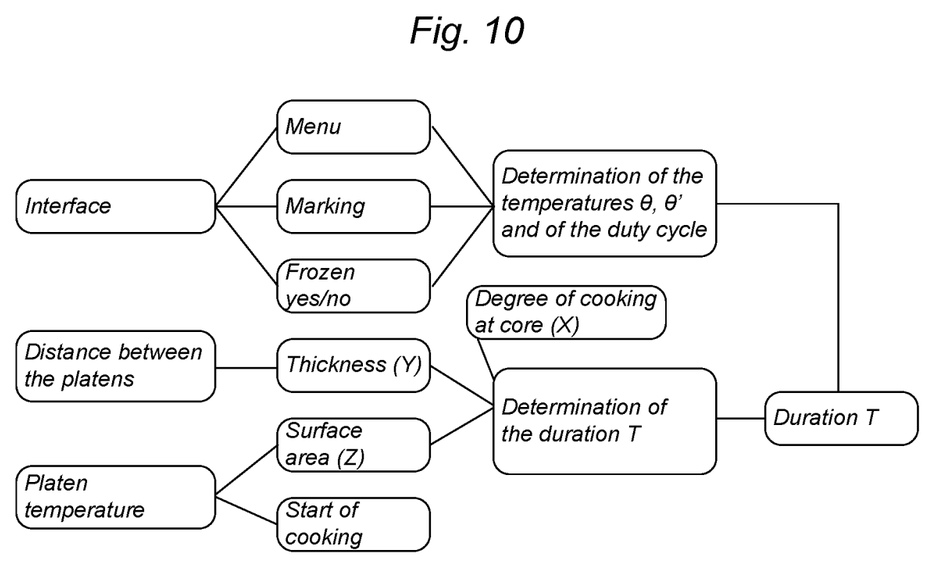
FIG. 10 shows a second block diagram of controlled cooking.

FIG. 10 shows a second block diagram scheme that details this case (it is recalled that the abovementioned steps of storage in memory 72, in the factory, of data, algorithms, etc, as mentioned above, are performed identically in this case).

Thus, when the user decides to use the apparatus that he or she has just bought, he or she simply has to engage the latter which is set to preheating mode, in the way already explained.

The following then takes place:

when the apparatus is operating and to achieve an internal cooking of the food to a greater or lesser degree then desired by a user, the user places the food in contact with the heating plate or plates, such as 61, 63, the apparatus then calculates a first cooking time (T) for the duly positioned food, as a function of the lowest temperature (X) out of those stored in memory, at the end of this calculated first cooking time (T), the apparatus indicates to the user that the corresponding cooking has been achieved (via, for example, the indicator 79), then:

if the user does not remove the food, the apparatus automatically applies a calculated second cooking time (T) for the food, as a function of the second in ascending order of said temperatures stored in memory (X); it will indeed be understood that this second cooking time will make it possible to increase the cooking of the food which will thus be cooked more, at the end of this calculated second cooking time (T), the apparatus again indicates to the user that the corresponding cooking has been achieved, and so on.

As already explained, the apparatus will, during operation:

measure the thickness (Y) of the food then positioned against said heating plate and/or estimate the surface area (Z) occupied by this food on this heating plate, calculate the cooking time (T) for the duly positioned food, based:

in addition to said internal cooking temperature (X) out of those stored in memory, on the thickness (Y) of the food and/or on the surface area (Z) occupied by the food.

For the remainder, the explanations have already been given; they remain valid.

It should however be noted that here it is considered that a cooking apparatus that is heated electrically, by elements, would address the issues already described, provided that it comprised:

in addition to at least one heating plate to position the food to be cooked, and in conjunction with a microcontroller (such as 73, 75, 77) provided in the apparatus, means for estimating a surface area (Z) occupied by the food on the heating plate, via at least one temperature sensor (such as 11, 11a, 11a) which:

regulates the temperature of the heating plate for which it measures the temperature, and changes the quantity of electrical energy to be supplied, as a function of the size of the surface area occupied by the food on the heating plate, in order to compensate the temperature drops linked to the placement of the food, or of the food items, on one of the heating plates, or between these heating plates.

The means for estimating a surface area (Z) will be able to be those of the description on the preceding pages.

Regarding the apparatus that is the subject of the present topic, it could also be an apparatus comprising only a single heating plate for cooking food by contact.

A cooking pan or any cooking utensil with a cap receiving on contact with it a food to be cooked (casserole, cooking pot, etc) should be able to be used, provided that it would be linked to a controllable heat source, as will have been understood from the above.

Notably in this case, provision could be made for the means for measuring the thickness (Y) of the food placed in contact with the heating plate to be a cover that can be positioned movably on the utensil and provided with the appropriate sensor already described. The cover could be annular.

To favor the food/heating plate(s) contact, each plate will in any case, preferably be full. A grill solution would not then be suitable.

In the above, with reference to the solutions illustrated, provision has been made for the or each (useful) value of internal cooking temperature (X) for the food to be prestored in the memory of the apparatus, in the factory, before the first operational use of this apparatus. Provision could however be made for this (these) data to be input into memory 72 by the user, for example via the interface 67. Thus, it is possible to provide for the user to enter into memory 72 a cooking temperature value (X) of 45° C., for a meat that is desired to be rare. In this case, it would be possible for there not to be, in the factory (therefore before the marketing of the apparatus), any storage in memory notably of the different internal cooking temperature(s) (X) for the food.

It will also be noted that, used alone, independently of the combination of the other abovementioned features, the following method also addresses the issues described above.

A method for implementing a cooking apparatus for a food, cooked electrically and comprising at least one heating plate against which the food is positioned (for cooking by contact), said method comprising at least one step of estimation of the surface area (Z) occupied by the food on said heating plate, this step comprising a sub-step of measurement of the temperature of said heating plate by at least one temperature sensor, and a sub-step of determination of the slope of the temperature curve obtained from measurements of at least one temperature sensor, said slope making it possible to determine whether said surface area of the heating plate is occupied by the food.

It is recommended that the temperature measurements on said heating plate be conducted by the abovementioned sensor(s) 11/11a, 11b positioned as indicated.

The same comment applies as above regarding the interesting use alone, independently of the combination of the other abovementioned features, of one or other of the following methods, which also address the issues described above:

a method for implementing a cooking apparatus heated electrically and comprising at least one heating plate on which a food is positioned (for cooking by contact), said method comprising a step of preheating A) of the apparatus followed by a step of cooking of the food B), the start of the cooking step B) being detected by a lowering beyond a predetermined threshold of the temperature of the heating plate, a method for implementing a cooking apparatus heated electrically and comprising at least one heating plate on which the food is positioned (for cooking by contact), said method comprising a step of calculation by the apparatus of the cooking time for the food as a function of at least one internal cooking temperature value (X) for the food pre-stored in the memory of the apparatus before its first operational use.

The invention claimed is:

1. A method for implementing an apparatus for cooking a food, comprising two heating plates for heating the food upon its contact, wherein the method comprises:

storage in a memory of the apparatus of different internal cooking temperatures (X) for the food, to achieve an internal cooking temperature of the food to a greater or lesser degree as then desired by a user, by a placing of the food in contact with the heating plates, wherein, with the apparatus operating and when the food is in contact with the heating plates, the apparatus records a measured thickness (Y) of the food, and/or records an estimated trend of a slope of the measured temperatures of at least one of the heating plates and the apparatus calculates cooking times (T) for the food as a function of the recorded thickness (Y) of the food and/or as a function of the estimated trend of a slope of the measured temperatures of at least one of the heating plates, the cooking times (T) including a first cooking time and a second cooking time, then, the cooking times (T) for the food are determined by a calculation of the first cooking time (T) for the food, as a function of a lowest temperature (X) out of those stored in the memory, at the end of said calculated first cooking time (T), an indication to the user, by the apparatus, that a first cooking result has been achieved, then:

an automatic application by the apparatus of the calculated second cooking time (T) for the food increasing the cooking of said food, the calculation of the second cooking time (T) being a function of a second lowest internal cooking temperature of said temperatures stored in memory (X), wherein the thickness is measured from a sensor and/or the temperatures are measured using at least a temperature sensor placed in contact with one of the heating plates, and at the end of the calculated second cooking time (T), another indication to the user, by the apparatus, that a second cooking result has been achieved, the second cooking result being different than the first cooking result.

2. The method as claimed in claim 1, wherein, during an operation of the apparatus to achieve the desired internal cooking temperature, the following are performed:

an estimation of a surface area (Z) occupied by the food on the heating plates, the calculation of the cooking times (T) for the food, based:
in addition to the selected cooking temperature (X),
on the thickness (Y) of the food, and/or on the surface area (Z) occupied by the food.

3. The method as claimed in claim 2, wherein, during the step or steps of estimation of the surface area (Z) occupied by the food and/or of the thickness (Y) of the food, and/or of the calculation of the cooking time (T) for the food, there is marking of the food, with an electrical power delivered by the apparatus which is maximum.

4. The method as claimed in claim 1, wherein the or each internal cooking temperature value (X) for the food stored in the memory of the apparatus is prestored in a factory, before a first operational use of the apparatus.

5. The method as claimed in claim 1, wherein, during said operation of the apparatus, the food is positioned between said heating plates, on their contacts.

6. The method as claimed in claim 1, wherein the cooking time (T) for the food is obtained by a quadratic or linear correlation calculation method.

7. The method as claimed in claim 1, further comprising, before the food is placed in contact with the heating plates, a step (A) of preheating of the apparatus followed by a step (B) of cooking of the food, the start of which is detected by a lowering beyond a predetermined threshold of the temperature of the heating plates.

8. The method as claimed in claim 1, further comprising at least one of the following steps:
selection of a category of the food to be cooked, and/or
selection of a frozen state of the food, and/or
selection of a desired grill marking of the food.

9. The method as claimed in claim 8, wherein the cooking temperature ($\theta$) for the food and a preheating temperature ($\theta'$) are a function of said selection made.

10. The method as claimed in claim 1, wherein, after having positioned the food in contact with the heating plates, the thickness (Y) of the food is measured and, as a function of this measurement, the cooking of the food is triggered or not by the calculation of the cooking time.

11. A method for implementing an apparatus for cooking a food, comprising two heating plates for heating the food upon its contact, wherein the method comprises:

storage in a memory of the apparatus of different internal cooking temperatures (X) for the food, to achieve an internal cooking temperature of the food to a greater or lesser degree as then desired by a user, by a placing of the food in contact with the heating plates, then, a calculation of a first cooking time (T) for the food, as a function of a lowest temperature (X) out of those stored in the memory, at the end of said calculated first cooking time (T), an indication to the user, by the apparatus, that a first cooking result has been achieved, then:

an automatic application by the apparatus of a calculated second cooking time (T) for the food increasing the cooking of said food, the calculation of the second cooking time (T) being a function of a second lowest internal cooking temperature of said temperatures stored in memory (X), at the end of the calculated second cooking time (T), another indication to the user, by the apparatus, that a second cooking result has been achieved, the second cooking result being different than the first cooking result, wherein, during an operation of the apparatus to achieve the desired internal cooking temperature, the following are performed:

a measurement of a thickness (Y) of the food then positioned against said heating plates and/or an estimation of a surface area (Z) occupied by the food on the heating plates, the calculation of the cooking times (T) for the food, based:
in addition to the selected cooking temperature (X),
on the thickness (Y) of the food, and/or on the surface area (Z) occupied by the food, wherein the calculation of the cooking times (T) for the food is a function of said surface area (Z) occupied by the food, which is obtained by heating plate temperature measurements.

12. The method as claimed in claim 11, wherein, to estimate the surface area (Z) occupied by the food, there is measured, by at least one temperature sensor and following the placing of the food in contact with the heating plates, the temperature of the heating plates, and the variation of the measured temperature evolving therefrom is compared to at least one reference threshold.

13. The method as claimed in claim 11, wherein the calculation of the cooking time (T) for the food is a function of said surface area (Z) occupied by the food and, to estimate this surface area, a single temperature sensor is used, which, following the placing of the food in contact with the heating plates, measures the temperature of said heating plates, away from the area of contact of the food, and the measured temperature variations which evolve therefrom or a time that is then calculated until a stabilization of the measured temperature, after said placement in contact, are compared to at least one threshold.

14. The method as claimed in claim 11, wherein the calculation of the cooking time (T) for the food is a function of said surface area (Z) occupied by the food and, to estimate this surface area, a number of temperature sensors are used which, following the placing of the food in contact with the heating plates, measure the temperature of said heating plates, in the area of contact of the food, and the measured temperature variations which evolve therefrom or a time that is then calculated until a stabilization of the measured temperature, after said placement in contact, are compared to at least one threshold.

15. A cooking apparatus, the apparatus comprising two heating plates for heating a food upon its contact between a first one and a second one of the two heating plates, the apparatus comprising, to achieve an internal cooking of the food to a greater or lesser degree as desired by a user:

- a memory for storing different internal cooking temperatures (X) for the food,
- means for measuring a thickness (Y) of the food then positioned in contact with the heating plates and/or means for estimating a surface area (Z) occupied by the food on the two heating plates,
- means for calculating a first cooking time (T) for the food, based: on a lowest one of the internal cooking temperatures (X) out of those stored in memory, and on the thickness (Y) of the food, and/or on the surface area (Z) occupied by the food;
- means for calculating a second cooking time (T) for the food, based: on a second lowest one of the internal cooking temperatures (X) out of those stored in memory, and on the thickness (Y) of the food, and/or on the surface area (Z) occupied by the food; and
- means for indicating to the user, by the apparatus, that a first cooking result has been achieved at the end of the first cooking time (T) depending on the at least one of the internal cooking temperature values (X), and on a measured thickness (Y) of the food and/or on estimated surface area (Z) occupied by the food on the heating plates, and that a second cooking result has been achieved at the end of the second cooking time (T), the second cooking result being different than the first cooking result,
- wherein, with the apparatus operating and when the food is in contact with the heating plates, the apparatus is configured to record the thickness (Y) of the food, and/or records an estimated trend of a slope of the measured temperatures of at least one of the heating plates and the apparatus calculates the cooking times (T) for the selected kind of food item as a function of the recorded thickness (Y) of the food and/or as a function of the estimated trend of a slope of the measured temperatures of at least one of the heating plates.

* * * * *